United States Patent [19]

Schoen

[11] 4,223,890

[45] Sep. 23, 1980

[54] SET OF TILES FOR COVERING A SURFACE

[76] Inventor: Alan H. Schoen, 316 W. Oak St., Carbondale, Ill. 62901

[21] Appl. No.: 34,245

[22] Filed: Apr. 30, 1979

[51] Int. Cl.[2] .......... A63F 9/10; B44F 7/00; F16B 2/00; B32B 3/10

[52] U.S. Cl. .......... 273/157 R; 52/311; 428/33; 428/44

[58] Field of Search .......... 52/311; 428/33, 44, 428/47, 54, 55; 273/156, 157 R

[56] References Cited

U.S. PATENT DOCUMENTS

| | | | |
|---|---|---|---|
| 3,065,970 | 11/1962 | Besley | 273/160 |
| 3,637,217 | 1/1972 | Kent | 273/157 R |
| 3,665,617 | 5/1972 | Gilbert | 428/33 |
| 4,063,736 | 12/1977 | Robinson | 273/157 R |
| 4,133,152 | 1/1979 | Penrose | 428/47 |

OTHER PUBLICATIONS

"Mathematical Models", 2nd Ed., Cundy & Rollett, 1961, Oxford University Press, London.

"Recreational Problems in Geometric Dissections & How To Solve Them", Lindgren, 1972, Dover Publications, N.Y.

"Polyominoes", Lushbaugh, 1965, Charles Scribner's Sons, N.Y.

*Primary Examiner*—William R. Dixon, Jr.

*Attorney, Agent, or Firm*—Russell & Nields

[57] ABSTRACT

A set of tiles for covering a regular polygon having an even number of sides is composed of tiles each of which is distinct from the other tiles in the set. The tiles in the set may be combined so as to form the regular polygon in a number of ways which increases very rapidly with increasing numbers of sides. The tiles of the invention may be used as a recreational puzzle, as a game, as an educational tool, for aesthetic purposes, and for a variety of other uses.

3 Claims, 2 Drawing Figures

SET OF TILES FOR COVERING A SURFACE

FIELD OF THE INVENTION

This invention relates to the field of geometry known as tessellation, which has been defined as the covering of prescribed areas with tiles of prescribed shapes. Practical applications of this field include the design of paving and wall-coverings, the production of toys and games, and educational tools.

BACKGROUND OF THE INVENTION

Perhaps the simplest and best-known form of tessellation is the jig-saw puzzle, in which a very simple shape, such as a rectangle or a circle, is covered with a multitude of pieces of irregular and usually distinct shape. A major characteristic of a jig-saw puzzle is the fact that it can only be assembled in one particular way. More sophisticated forms of tessellation have included the use of identical pieces which may be arranged to form a variety of shapes, such as so-called "polyominoes". A recent form of tessellation is disclosed in U.S. Pat. No. 4,133,152 to Penrose.

An example of polyominoes is the set of 29 different "pentacubes" which—when supplemented by a single extra pentacube which is a duplicate of one of the set of 29—forms bricks of four different shapes, each of volume equal to 150 unit cubes. This is disclosed in U.S. Pat. No. 3,065,970 to Besley, Nov. 27, 1962.

Three-dimensional puzzles have also been devised making use of sets of pieces derived from simple solid shapes, such as Piet Hein's Soma cube sold by Parker Brothers.

SUMMARY

The present invention differs from all tessellation schemes of the prior art, in that the set of tiles of the invention is composed of distinct pieces which can be arranged in a variety of ways to form the identical regular polygon having an even number of sides. While the set may be constructed relatively easily, the number of ways in which the regular polygon may be formed therefrom increases rapidly for increasing numbers of sides of the polygon. Sets of tiles in accordance with the invention may thus be used to construct a hierarchy of puzzles having widely differing complexity. The tiles of the invention may also be used as a game, for educational purposes, and in the arrangement of aesthetic designs.

The set of tiles of the invention is prepared by preparation of a set of rhombuses in a known way from a regular polygon having an even number of sides. This preparation step yields an inventory of rhombuses, many of which are distinct from each other, but some of which are the same as other rhombuses in the inventory.

As a first step in the preparation of the set of tiles of the invention, one specimen of each rhombus shape is selected from the inventory. These rhombuses form part of the set of tiles of the invention. The remaining tiles in the set of the invention are prepared by combining the shapes which are found in the inventory into pairs in accordance with certain prescribed rules. This could be done by using the rhombuses already selected, each of which has a distinct shape, as models for additional rhombuses, and thus building up an ample supply of rhombuses for use in pair formation. However, it is a very remarkable coincidence that the rhombuses which are left in the inventory after the selection of the single rhombuses is precisely the correct number of specimens for formation of the rhombus-pairs in accordance with the invention. This is quite remarkable because, as will appear from the following detailed description of the invention, the rules for pair formation are quite independent of the source of the inventory of rhombuses used therefor.

In addition to arranging the set of tiles of the invention to form a regular polygon, the same set of tiles may also be arranged so as to form a closed domain which can constitute a lattice unit cell for a repeating pattern. This is a striking property of the set of tiles of the invention, since the lattice unit cell thus formed is in all but two cases not the regular polygon from which the set of tiles was derived. The repeating pattern thus formed is useful in the formation of patterns for wallpaper and the like.

A plurality of sets of tiles in accordance with the invention may be arranged, not only into a corresponding plurality of regular polygons, but also into the form of one such polygon surrounded by one or more nested rings. Thus, a regular polygon formed from a set of tiles of the invention may be surrounded by three additional sets of such tiles to form an enlarged regular polygon, the enlarged polygon thus formed may be surrounded by five still additional sets of such tiles to form a still larger regular polygon.

Thus, the set of tiles of the invention has interesting and useful properties beyond those of the simple formation of a regular polygon in a variety of ways.

DETAILED DESCRIPTION OF PREFERRED EMBODIMENTS

The invention may best be understood from the following detailed description thereof, having reference to the accompanying drawings, in which.

Figure 1:
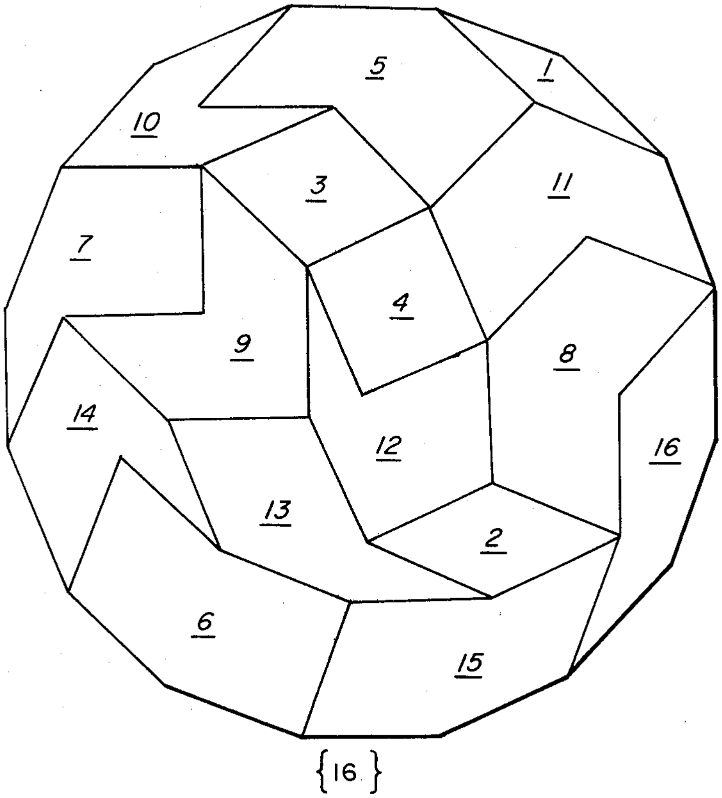
FIG. 1 is a plan view of an assembly of tiles arranged into a regular polygon in accordance with the invention.

Referring to the drawings, and first to FIG. 1 therein is shown a set of tiles constructed according to my invention and arranged upon a regular polygon having sixteen sides. Each tile is distinct from all the other tiles. The same set of tiles can be arranged in different ways to form the same polygon. The number of ways of so arranging the tiles of FIG. 1 is in excess of two hundred.

Each tile in FIG. 1 is constructed from one or two rhombuses. Whenever two rhombuses are combined to form a tile of the invention, no two edges at any vertex may be collinear. This results in the fact that each vertex at which the two rhombuses join may readily be seen in the resulting tile because an angle is formed in the tile. Thus, among the tiles of FIG. 1, tiles 1, 2, 3 and 4 have been formed from a single rhombus, and the remaining tiles have been formed from a pair of rhombuses. Of the remaining tiles, tiles 5, 6, and 7 have been formed from a square and another rhombus; tiles 8, 9, and 10 have been formed from two identical rhombuses; and the remaining tiles 11, 12, 13, 14, 15, and 16 have been formed from two non-identical rhombuses. Among tiles 11–16, tiles 11 and 15, 12 and 13, and 14 and 16 form pairs of "fraternal twins" because the two rhombuses of which each member of the pair is composed are identical to the rhombuses of which the other member of the pair is composed; however, the arrangement of the pair results in two distinct tiles.

For any regular polygon having an even number of sides, a set of tiles may be constructed in accordance with the invention in the following manner.

First, the regular polygon is dissected into a set of rhombuses in the following manner. The four sides of each rhombus will, of course, have the same length as any side of the regular polygon. If the number of sides of the polygon p is equal to 4*q*, where q is any integer (i.e. a so-called "evenly even" number of sides), then the set of rhombuses will include q different species of rhombus, of which there are q squares and 2*q* of each of the other (q−1) species of rhombus. The total number of rhombuses is thus q(2q−1). When formed into a set of tiles in accordance with the invention, the total number of tiles in the set is $q^2$. Each species of rhombus may be designated by its smaller face angle, which must be an integral multiple of 360°/p wherein the integer is not greater than q.

Figure 2:
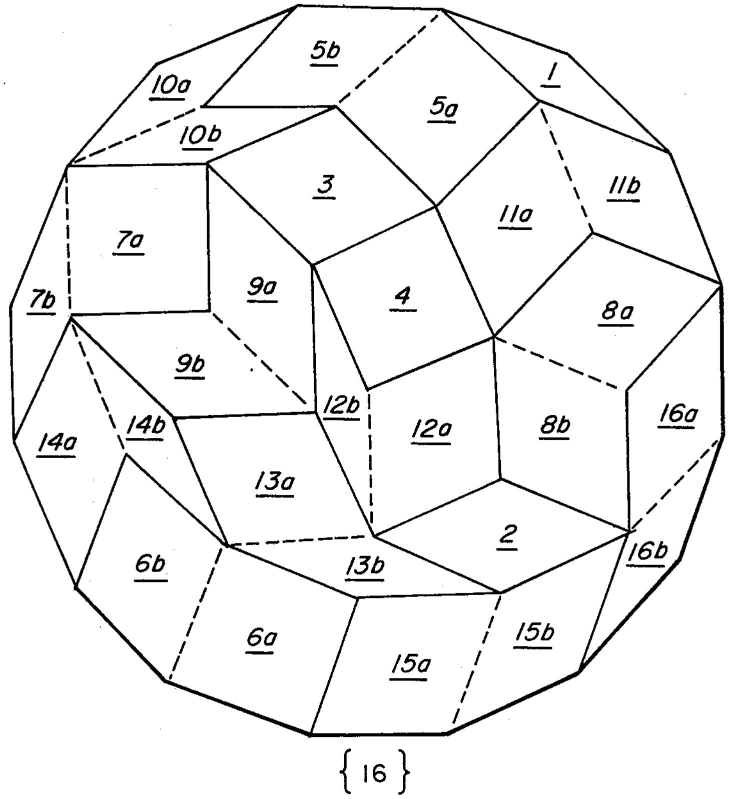
FIG. 2 is a plan view of a set of rhombuses from which the tiles shown in FIG. 1 may be constructed.

The set of rhombuses which is used to form the set of tiles of FIG. 1 is shown in FIG. 2. Referring thereto, squares are shown at 4, 5*a*, 6*a*, and 7*a*. Since in the polygon of FIG. 2 p is 16, q must be 4 and so there are 4 squares. The square represents the case in which the smaller angle of the rhombus is 90°, which is an integral multiple of 360/p in which the integer is 4(i.e., q). There should be 2q, or 8, rhombuses of the species in which the smaller angle is 360°/p times 3 (67.5°), and these are shown in FIG. 2 at 3, 6*b*, 8*a*, 8*b*, 11*a*, 12*a*, 13*a*, and 15*a*. There should be 2q, or 8, rhombuses of the species in which the smaller angle is 360°/p times 2 (45°), and these are shown in FIG. 2 at 2, 5*b*, 9*a*, 9*b*, 11*b*, 14*a*, 15*b*, and 16*a*. There should be 2q, or 8, rhombuses of the species in which the smaller angle is 360°/p times 1 (22.5°), and these are shown in FIG. 2 at 1, 7*b*, 10*a*, 10*b*, 12*b*, 13*b*, 14*b*, and 16*b*.

While the complete set of rhombuses is shown in FIG. 2 as being arranged in the regular polygon, this is only to aid in an understanding of the invention. In order to construct the set of rhombuses from the regular polygon, it is not necessary to arrange them in any particular way, since the complete information for constructing the set of rhombuses, given hereinabove, is quite independent of any particular arrangement thereof.

Having constructed the requisite set of rhombuses, the set of tiles is constructed in accordance with the invention in the following manner. First, one specimen of each distinct rhombus is selected from the set of rhombuses as a tile. Referring to FIG. 1, tiles 1, 2, 3, and 4 have been formed from a single rhombus; and, of course, this is the total number of distinct rhombuses shown in FIG. 2. The remaining tiles are constructed from pairs of the remaining rhombuses of the set in FIG. 2, bearing in mind that no two edges at any vertex may be collinear. This automatically means that no two squares may form a tile, and so we may construct an additional 3 tiles by combining a square with each of the other rhombus species. Referring to FIG. 1, tiles 5, 6 and 7 have been formed from a square and each of the other species of rhombus.

Next, we may construct an additional 3 tiles by combining each of the non-square rhombus species with a rhombus identical thereto, thereby forming what I call an "identical twin" or "chevron". Referring to FIG. 1, tiles 8, 9, and 10 are identical twins or chevrons.

Each of the remaining rhombuses may be formed into a tile by combining it with a rhombus of different species in either of two ways, thereby forming two distinct "isomeric" forms of fraternal twin. For example, tile 11 in FIG. 1 has been formed by combining rhombus 11*a* and rhombus 11*b* in such a way as to form the "short" form of the fraternal twin, while tile 15 in FIG. 1 has been formed by combining the same two species of rhombus in such a way as to form the "long" form of the fraternal twin. Tile 12 is the "short" form of a fraternal twin of which the "long" form is tile 13. Tile 14 is the "short" form of a fraternal twin of which the "long" form is tile 16.

Although the construction of the tiles of FIG. 1 has been explained hereinabove making reference to FIGS. 1 and 2, it is clear from the foregoing that the construction of the tiles from the set of rhombuses can easily be accomplished without reference to the regular polygon which is to form the basis for the tessellation pattern.

It should be noted that, although the combination of a square with another species of rhombus might be regarded as a fraternal twin, the other fraternal twin corresponding thereto is the mirror image of the first, and so only one tile is formed from the combination of a square with any other species of rhombus.

In the foregoing description of the dissection of the 16-shaped polygon of FIGS. 1 and 2, the rules applicable to a polygon of 4q sides were followed. The only other possible polygons having an even number of sides are those in which the number of sides is equal to $4(q+\frac{1}{2})$. In such a case the set of rhombuses will include q different species of rhombus and 2q+1) specimens of each species. The total number of rhombuses is thus q(2q+1). When formed into a set of tiles in accordance with the invention, the total number of tiles in the set is q(q+1). As in the case of the so-called evenly-even-sided polygon, each species of rhombus may be designated by its smaller face angle, which must be an integral multiple of 360°/p wherein the integer is not greater than q. The largest possible such angle is therefore less than 90°, and so none of the rhombuses are square.

It is apparent from the foregoing that the set of rhombuses necessary to form the set of tiles can readily be constructed, and the construction of the tiles from the set of rhombuses can easily be accomplished, all without reference to the regular polygon which is to form the basis for the tessellation pattern. That is to say, it is not necessary to solve the tiling puzzle in order to construct the set of tiles.

The restriction imposed on rhombus-pair formation in accordance with the invention, to the effect that no two edges at any vertex may be collinear, is an important one, because if any pair so formed is used as one tile of the set of tiles, the formation of the desired regular polygon cannot be completed.

Having thus described the principles of the invention, together with illustrative embodiments thereof, it is to be understood that although specific terms are employed, they are used in a generic and descriptive sense,, and not for purposes of limitation, the scope of the invention being set forth in the following claims.

I claim:

1. A set of tiles for covering a plane surface bounded by a regular polygon of 2n sides, for forming a repeatable cell, and for other purposes, said regular polygon being dissectible into a set of (n−1)n/2 rhombuses, comprising one specimen of each distinct rhombus in said set and one specimen of each distinct shape formed by combining two of the remaining rhombuses in said set in such a manner that no two edges at any vertex are collinear.

2. A set of tiles according to claim 1, wherein the number of sides $2n=4q$, wherein the smaller angle of each said rhombus is an integral multiple of $360°/2n$ wherein the integer is not greater than q, and wherein said set of rhombuses includes q squares and 2q of each of the other $(q-1)$ species of rhombus, so that the total number of tiles in the set is $q^2$.

3. A set of tiles according to claim 1, wherein the number of sides $2n=4(q+\frac{1}{2})$, wherein the smaller angle of each said rhombus is an integral multiple of $360°/2n$ wherein the integer is not greater than q, and wherein said set of rhombuses includes $2q+1$ of each species of rhombus, so that the total number of tiles in the set is $q(q+1)$.

* * * * *